United States Patent
Buckner

(10) Patent No.: US 9,567,883 B2
(45) Date of Patent: Feb. 14, 2017

(54) SYSTEM TO GENERATE PRESSURIZED AIR FOR HYDRO-EXCAVATION

(71) Applicant: Don M. Buckner, Okahumpka, FL (US)

(72) Inventor: Don M. Buckner, Okahumpka, FL (US)

(73) Assignee: VAC-TRON EQUIPMENT, LLC, Oxahumpka, FL (US)

( * ) Notice: Subject to any disclaimer, the term of this patent is extended or adjusted under 35 U.S.C. 154(b) by 51 days.

(21) Appl. No.: 14/597,583

(22) Filed: Jan. 15, 2015

(65) Prior Publication Data
US 2016/0208664 A1    Jul. 21, 2016

(51) Int. Cl.
| | |
|---|---|
| *F01N 1/08* | (2006.01) |
| *E02F 3/88* | (2006.01) |
| *F22B 1/18* | (2006.01) |
| *E21B 7/18* | (2006.01) |
| *E02F 5/10* | (2006.01) |

(52) U.S. Cl.
CPC ............. *F01N 1/084* (2013.01); *E02F 3/8891* (2013.01); *E02F 5/107* (2013.01); *E21B 7/18* (2013.01); *F22B 1/18* (2013.01)

(58) Field of Classification Search
CPC .......... E02F 3/8891; E02F 3/925; E02F 5/107; E02F 5/108; E21B 7/18; F22B 1/18; F01N 1/084
USPC .................................................. 37/323, 905
See application file for complete search history.

(56) References Cited

U.S. PATENT DOCUMENTS

| | | | |
|---|---|---|---|
| 629,048 A | 7/1899 | Sibley | |
| 666,799 A | 1/1901 | Buckwalter | |
| 1,915,594 A | 6/1933 | Cobb | |
| 2,057,691 A | 10/1936 | Ranney | |
| 2,297,756 A * | 10/1942 | Fender | B08B 9/0933 37/323 |
| 2,660,155 A * | 11/1953 | Chapman | F22B 37/102 122/6 A |
| 2,678,203 A * | 5/1954 | Huff | E21C 25/60 175/213 |
| 2,919,540 A * | 1/1960 | Percival | F02G 5/02 122/41 |

(Continued)

*Primary Examiner* — Jamie L McGowan
(74) *Attorney, Agent, or Firm* — Matthew G. McKinney, Esq.; Allen, Dyer, Doppelt, Milbrath & Gilchrist, P.A.

(57) ABSTRACT

A system to generate pressurized air for hydro-excavation includes an exhaust silencer configured to hold water and an exhaust manifold disposed through the silencer, where the exhaust manifold is configured to be in fluid communication with an internal combustion engine in order to receive exhaust gases to heat the exhaust silencer. In addition, the system includes a steam turbine configured to be driven by steam generated in the exhaust silencer, a primary steam line secured proximate to an upper end of the silencer to connect to the steam turbine, and an air compressor driven by the steam turbine to generate pressurized air. A secondary steam line is in fluid communication with the primary steam line and the air compressor to generate a mixture of the steam and pressurized air for use in hydro-excavation. The system also includes a vacuum pump driven by the internal combustion engine, a suction hose configured to excavate materials using a vacuum pressure generated by the vacuum pump, a debris tank in fluid communication with the suction hose, and a nozzle configured to receive and discharge the mixture of the steam and pressurized air in order to break up soil.

20 Claims, 3 Drawing Sheets

(56) References Cited

U.S. PATENT DOCUMENTS

| | | | |
|---|---|---|---|
| 3,022,985 A * | 2/1962 | Mair | F28B 3/04 |
| | | | 122/31.1 |
| 3,101,588 A * | 8/1963 | Perry | F02G 5/02 |
| | | | 60/281 |
| 3,101,799 A * | 8/1963 | Grabow | E21B 7/18 |
| | | | 166/222 |
| 3,404,731 A | 10/1968 | Cushman | |
| 3,884,194 A | 5/1975 | Grosseau | |
| 4,201,058 A * | 5/1980 | Vaughan | F01K 23/14 |
| | | | 60/618 |
| 4,299,193 A | 11/1981 | Dworschak | |
| 4,453,496 A * | 6/1984 | Yoshinari | F22B 21/065 |
| | | | 122/155.2 |
| 4,912,928 A | 4/1990 | Kaneko et al. | |
| 6,470,605 B1 | 10/2002 | Gilman et al. | |
| 6,604,304 B1 | 8/2003 | Slabach et al. | |
| 7,063,134 B2 | 6/2006 | Poole et al. | |
| 8,858,124 B2 | 10/2014 | Lamonte | |
| 2005/0172631 A1 | 8/2005 | Primlani | |
| 2010/0146953 A1 | 6/2010 | Bhatti et al. | |
| 2010/0205950 A1 | 8/2010 | Hoetger et al. | |
| 2014/0373551 A1 | 12/2014 | Kraft et al. | |

\* cited by examiner

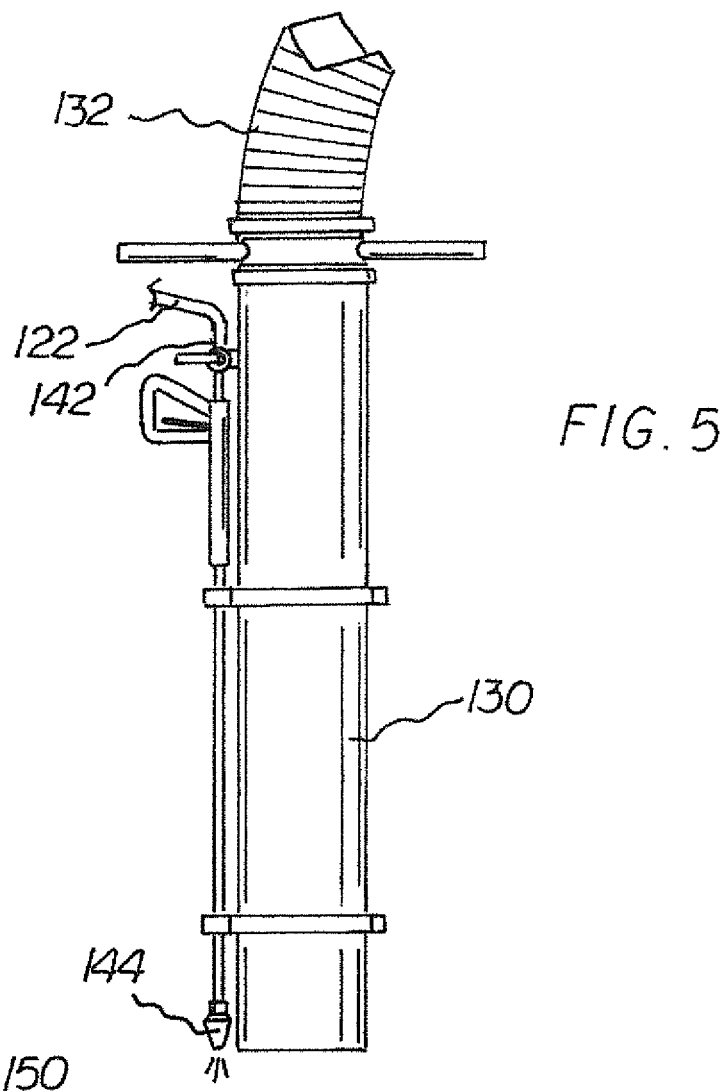
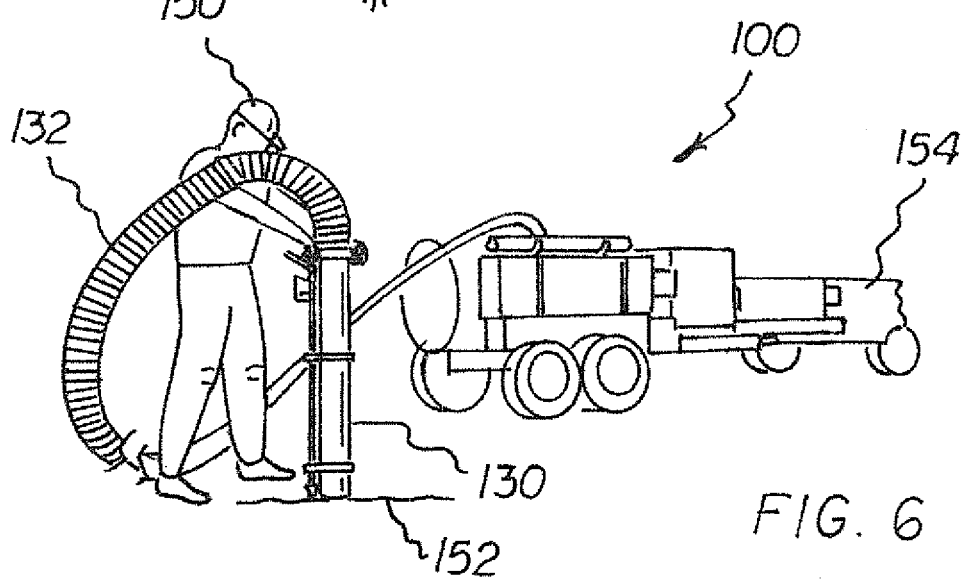

SYSTEM TO GENERATE PRESSURIZED AIR FOR HYDRO-EXCAVATION

I. FIELD

The present invention relates in general to a system to generate pressurized air for hydro-excavation.

II. DESCRIPTION OF RELATED ART

Industrial vacuum equipment has dozens of wet and dry uses such as locating underground utilities (potholing), hydro-excavation, air excavation and vacuum excavation. In addition, the equipment can be used for directional drilling slurry removal, industrial clean-up, waste clean-up, lateral and storm drain clean-out, oil spill clean-up and other natural disaster clean-up applications.

In particular, hydro-excavation applications use a combination of high pressure water to dig a hole where the resultant loose soils and water is collected by vacuum into a container or debris tank. The mixture of soils and water is known as a slurry. The hydro-excavation equipment may be mounted to a truck or trailer and is typically powered by gas or diesel engines. The slurry that is removed during excavation is required to be hauled away for disposal. Dry fill materials are then hauled back to the job site to back fill the hole and are compacted in place. The hauling of the slurry away from the job site and hauling new dry material back to the job site and compacting adds time and costs to the project.

Accordingly, what is needed is a hydro-excavation system that is as effective as current hydro-excavations systems but that does not saturate the soils during the excavation process so that the excavated materials are suitable to be returned to fill the hole for compaction. However, in view of the prior art at the time the present invention was made, it was not obvious to those of ordinary skill in the pertinent art how the identified needs could be fulfilled.

III. SUMMARY

A system to generate pressurized air for hydro-excavation is disclosed. In a particular embodiment, the system includes an exhaust silencer configured to hold water and an exhaust manifold disposed through the silencer, where the exhaust manifold is configured to be in fluid communication with an internal combustion engine in order to receive exhaust gases to heat the exhaust silencer. The exhaust manifold may also include a plurality of pipes orientated to transfer heat to the water in the exhaust silencer. In addition, the system may include a steam turbine configured to be driven by steam generated in the exhaust silencer, a primary steam line secured proximate to an upper end of the silencer to connect to the steam turbine, and an air compressor driven by the steam turbine to generate pressurized air. A secondary steam line may be in fluid communication with the primary steam line and the air compressor to generate a mixture of the steam and pressurized air for use in hydro-excavation. The system also includes a vacuum pump driven by the internal combustion engine, a suction hose configured to excavate materials using a vacuum pressure generated by the vacuum pump, and a debris tank in fluid communication with the suction hose. A high pressure hose and nozzle is adapted to discharge the mixture of the steam and pressurized air in order to break up soil during the hydro-excavation process. A heat exchanger may be in fluid communication between an outlet of the turbine and the exhaust silencer for condensing the steam to return water. In addition, the secondary steam line may include a secondary valve for controlling an amount of the steam to add to the pressurized air. The exhaust silencer is configured to be replenished with additional water to maintain a desired level of the water therein that reduces exhaust noise.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 5 is an elevational view of a vacuum hose and high pressure wand that may be used with the system to generate pressurized air for hydro-excavation; and FIG. 6 is a perspective view of a trailer and associated equipment that may be used with a particular embodiment of the system to generate pressurized air for hydro-excavation.

V. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
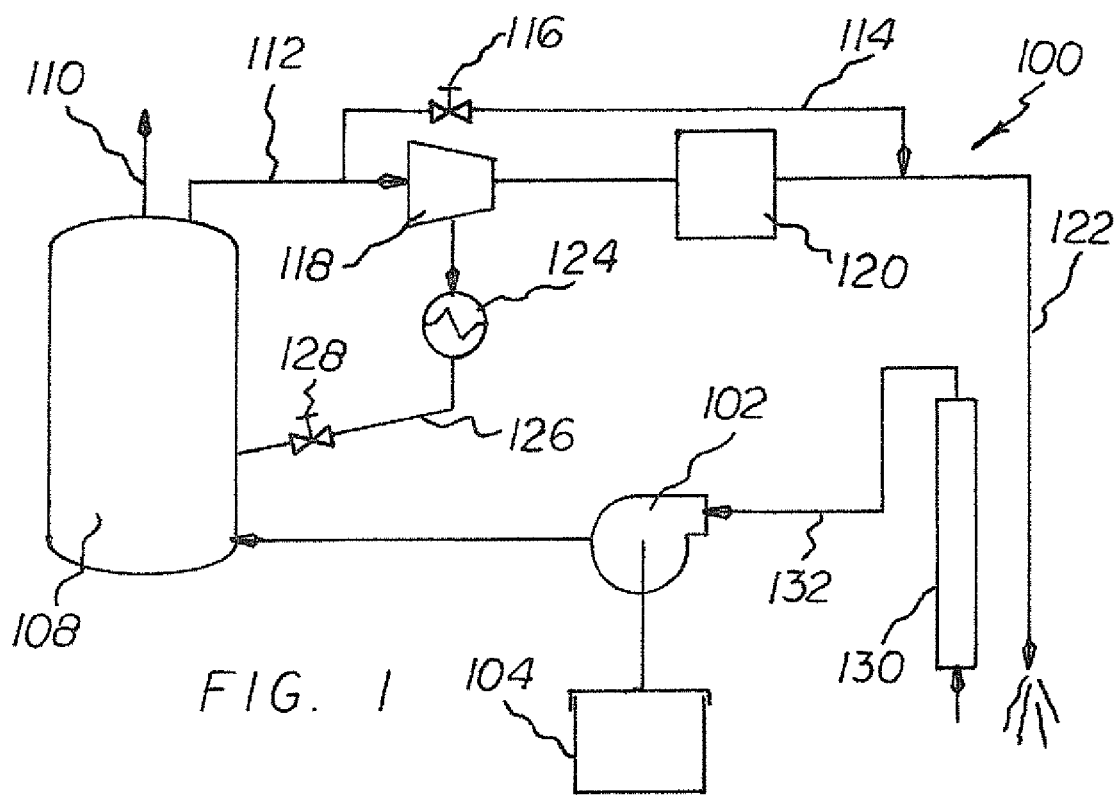
FIG. 1 is a schematic of a particular illustrative embodiment of a system to generate pressurized air for hydro-excavation.

Referring now to FIG. 1, a system to generate pressurized air for hydro-excavation is disclosed and generally designated 100. In this particular embodiment, a vacuum pump 102 is used to provide the vacuum pressure in order to excavate the soils and materials into a debris tank 104. The vacuum pump 102 is powered by an internal combustion engine that generates hot exhaust gases. The exhaust gas is provided to an exhaust silencer 108 using an exhaust manifold 106. The exhaust silencer 108 may be cylindrical in shape, or any other shape, and is adapted to hold water. The hot exhaust gases from the vacuum pump 102 flow through the exhaust manifold 106 so that as the hot gases flow through the a portion of the exhaust manifold 106 that is within the exhaust silencer 108, the heat from the exhaust gases is transferred to the water within the exhaust silencer 108. It is preferred to maintain the exhaust silencer 108 close to the vacuum pump 102 in order to reduce heat loses.

The exhaust manifold 106 exits from the exhaust silencer 108 through an exhaust port 110 proximate to a top portion of the exhaust silencer 108. Also located proximate to the top portion of the exhaust silencer 108 is a primary steam line that collects steam generated in the exhaust silencer 108 and provides the steam to a steam turbine 118. The steam turbine 118 drives an air compressor 120 that in turn provides pressurized air via an air line 122 to be used in hydro-excavation. In addition, a secondary steam line 114 may be in fluid communication with the primary steam line 112 and the air line 122. The secondary steam line 114 provides moisture to the pressurized air to generate a more powerful air stream than pressurized air alone. However, the steam that is added to the pressurized air is controlled by a mixture valve 116 that prevents the pressurized air from becoming oversaturated. As the steam exits the steam turbine 118, it passes through a heat exchanger 124 or condenser to return the steam to water. The water is then returned back to the exhaust silencer 108 via return line 126. The return line 126 may include a return valve 128 to control the flow of the return water. In addition, a water supply may be connected to the return line 126 in order to maintain a desired water level in the exhaust silencer 108. Also, an auxiliary heater 134 may be positioned proximate the bottom portion of the exhaust silencer 108 to assist in heating the water to generate steam in conjunction with the exhaust manifold 108.

Through the process of using hot, moist air enables the excavation of the soils and materials using a suction wand 130 and suction hose 130 without creating a watery slurry that is not suitable to be used for fill and compaction. Alternatively, the secondary steam line 116 may be used independently from the air compressor 120 for the hydro-excavation so that all the steam generated in the exhaust silencer 108 is used for hydro-excavation rather than to drive the steam turbine 118.

Figure 2:
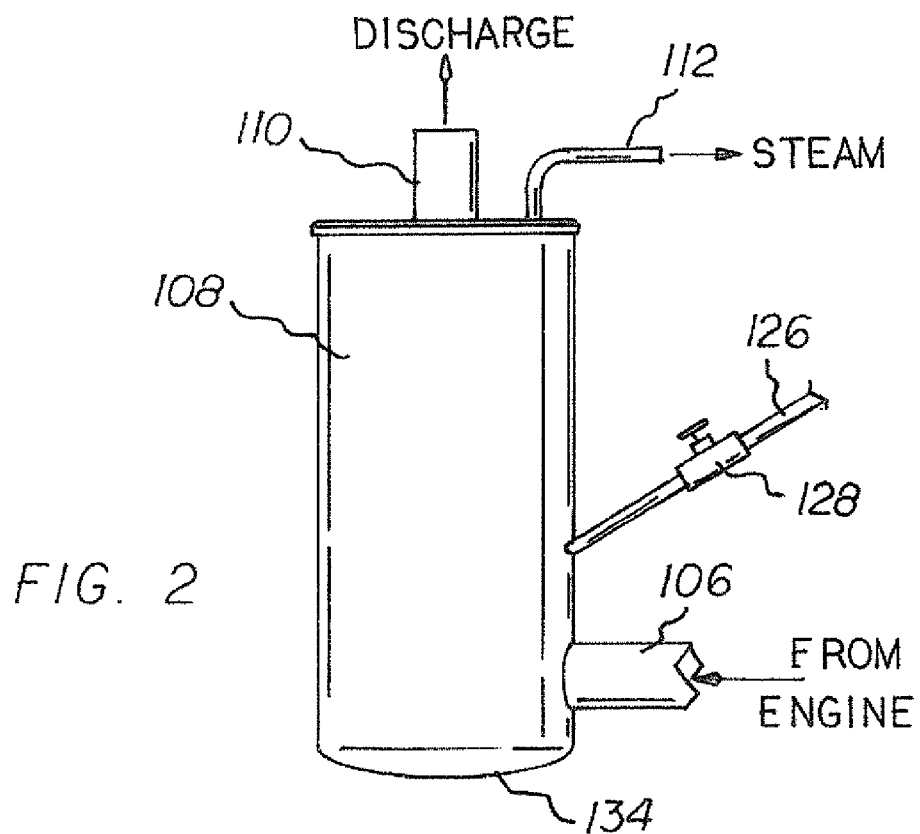
FIG. 2 is a perspective view of an exhaust silencer that may be used with a particular embodiment of the system to generate pressurized air for hydro-excavation.

Referring now to FIG. 2, an exemplary embodiment of the exhaust silencer 108 is illustrated showing the exhaust manifold 106 entering the exhaust silencer 108 proximate a bottom portion. The exhaust discharge port 110 is positioned proximate a top portion of the exhaust silencer 108. The steam is forced to exit the exhaust silencer 1-8 through the primary steam line 112. The return line 126 may be sloped downward into the exhaust silencer 108 so that the water returns via gravity flow.

Figure 3:
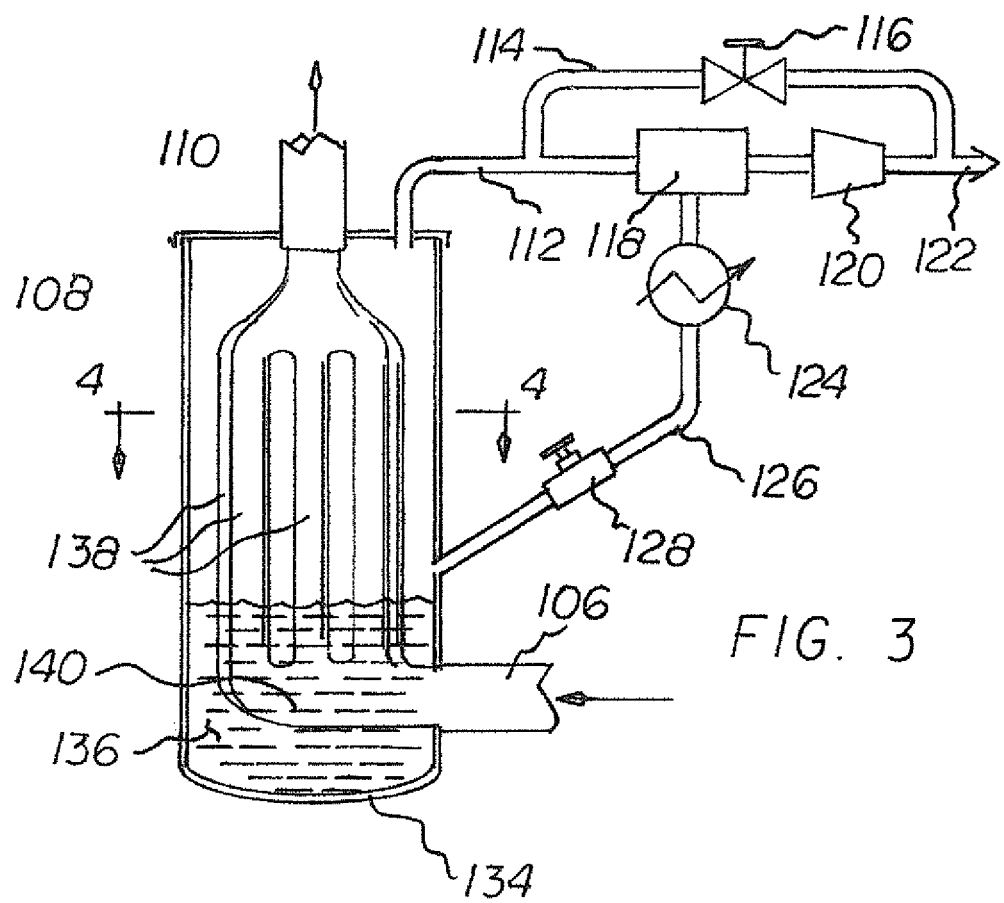
FIG. 3 is a sectional elevational view taken on line 3-3 of FIG. 2.

A sectional view of the exhaust silencer 198 is illustrated in FIG. 3. In this particular embodiment, the exhaust manifold 106 splits into a plurality of pipes 138 that are disposed along a vertical axis from a bottom portion to a top portion of the exhaust silencer 108. The inside space 136 of the exhaust silencer 108 is adapted to hold water 140 that is heated to generate steam. In addition, the water 140 reduces the exhaust noise. As described above, the steam generated by the exhaust silencer 108 is forced out through the primary steam line 112. From there, the primary steam line 112 is in fluid communication with the steam turbine 118. The primary steam line 112 may include a branch to a secondary steam line 114 that bleeds off some of the steam in order to add downstream to the compressed air line 122. The addition of steam to the air line 122 increases the ability of the compressed air 122 to break up loose soil without creating an overly saturated slurry. Instead, the amount of steam is sufficient to increase the efficacy of the pressurized air being used in the hydro-excavation process. In an alternative embodiment, the steam could be directed to the compressed air line 122 and bypass the steam turbine.

Figure 4:
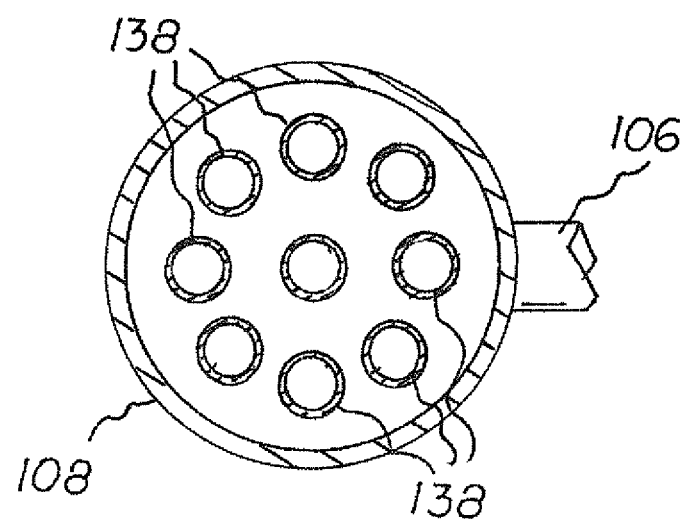
FIG. 4 is sectional top view taken on line 4-4 of FIG. 2.

The orientation of the exhaust manifold pipes 138 is illustrated in FIG. 4 in a top sectional view of the exhaust silencer 108. The pipes 138 are positioned within the exhaust silencer 108 in a circular pattern in order to provide the most effective heat transfer to the water to generate steam. In this particular illustrative embodiment there are eight exhaust manifold pipes 138 within the exhaust silencer 108. However, there could be more or less pipes depending on the desired configuration as long as the arrangement was sufficient to provide the heat transfer required to generate the steam.

Referring now to FIG. 5, a typical suction wand 130 is shown secured to the vacuum hose 132. The suction wand 130 is used to vacuum up the solids and other materials that are broken up by the pressurized air flowing from the nozzle 144. The nozzle 144 distributes a high velocity stream of hot moist air that is effective to break up the soil. In operation, an operator grasps handles of suction wand 130 and applies downward pressure to the ground. The vacuum hose 132 vacuums the soil to the debris tank 104. The high pressure air line 122 may be attached along the vacuum hose 132 or may run independently to the high pressure nozzle 144. The high pressure nozzle 144 may be removed from the suction wand 130 and used independently or secured to the side of the suction wand 130. A control valve 142 may be disposed in the air line 122 proximate the suction wand 130 in order for the operator to control the amount of flow to the nozzle 144.

The equipment for the hydro-excavation system described above may be transported to a site by a truck and trailer 154 similar to that shown in FIG. 6. The operator 150 is shown holding the suction wand 130 by the handles and applying downward pressure to the ground 152 to create a hole. The vacuum hose 132 is used to transfer all the soils and material being vacuumed by the suction wand 130 back to the debris tank 104. In comparison to a typical hydro-excavation system that uses a steady flow of water, the soils are relatively dry since only a mixture of steam and pressurized air was used to break up the ground 152. Accordingly, the excavated material can be brought back to the hole as needed and compacted since there is very little water present in the excavated materials. This is a significant improvement over existing hydro-excavation systems that use a high volume of water and create a slurry that is not suitable to be reused and compacted due to the high water content. Further, by adding a mixture of steam that has a high energy content increases the efficacy over existing excavation systems that use pressurized air alone and that have a lower energy content.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A system to generate pressurized air for hydro-excavation, the system comprising:
   an internal combustion engine;
   an exhaust manifold coupled to the internal combustion engine;
   a vacuum pump mechanically driven by the internal combustion engine;
   an exhaust silencer configured to hold water, wherein a portion of the exhaust manifold passes through the exhaust silencer to generate steam therein;
   a steam turbine configured to be driven directly by the steam generated in the exhaust silencer;
   a primary steam line secured proximate to an upper end of the exhaust silencer to connect to the steam turbine;
   an air compressor coupled to a mechanical output of the steam turbine to generate pressurized air;
   a return line coupled to an outlet of the steam turbine and configured to return the water from the steam turbine back to the exhaust silencer; and
   a secondary steam line configured to bleed off a portion of the steam from the primary steam line to add downstream to an output line of the air compressor to selectively generate a mixture of the steam and pressurized air for use in hydro-excavation.

2. The system of claim 1, further comprising:
a suction hose coupled to the vacuum pump and configured to excavate materials using a vacuum pressure generated by the vacuum pump;
a debris tank in fluid communication with the suction hose; and
a nozzle coupled to the output line and configured to receive and discharge the mixture of the steam and pressurized air.

3. The system of claim 1, the return line further comprising a heat exchanger in fluid communication between an outlet of the steam turbine and the exhaust silencer for condensing the steam into the water.

4. The system of claim 1, the secondary steam line further comprising a secondary valve for controlling an amount of the steam to add to the pressurized air.

5. The system of claim 4, the return line further comprising a primary valve for controlling an amount of the water to the exhaust silencer.

6. The system of claim 5, wherein the exhaust silencer is configured to be replenished with additional water to maintain a desired level of the water therein that reduces exhaust noise.

7. The system of claim 6, wherein the exhaust manifold further comprising a plurality of pipes orientated to transfer heat to the water in the exhaust silencer.

8. A system to generate pressurized air for hydro-excavation, the system comprising:
an exhaust manifold configured to be coupled to an internal combustion engine;
a vacuum pump configured to be mechanically driven by the internal combustion engine;
an exhaust silencer configured to hold water, wherein a portion of the exhaust manifold passes through the exhaust silencer to generate steam therein;
a steam turbine configured to be driven directly by the steam generated in the exhaust silencer;
a primary steam line secured proximate to an upper end of the exhaust silencer to connect to the steam turbine;
an air compressor coupled to a mechanical output of the steam turbine to generate pressurized air;
a secondary steam line configured to bleed off a portion of the steam from the primary steam line to add downstream to an output line of the air compressor to selectively generate a mixture of the steam and pressurized air for use in hydro-excavation; and
a nozzle coupled to the output line and configured to receive and discharge the pressurized air.

9. The system of claim 8, further comprising:
a vacuum pump mechanically driven by the internal combustion engine;
a suction hose coupled to the vacuum pump and configured to excavate materials using a vacuum pressure generated by the vacuum pump; and
a debris tank in fluid communication with the suction hose.

10. The system of claim 9, further comprising:
a return line coupled to an outlet of the steam turbine and configured to return the water from the steam turbine back to the exhaust silencer; and
a heat exchanger coupled to the return line and in fluid communication between an outlet of the turbine and the exhaust silencer for condensing the steam into the water.

11. The system of claim 10, wherein the exhaust silencer is configured to be replenished with additional water to maintain a desired level of the water therein that reduces exhaust noise.

12. A system to generate pressurized air for hydro-excavation, the system comprising:
an internal combustion engine;
an exhaust silencer configured to receive and hold water;
an exhaust manifold coupled to the internal combustion engine and the exhaust manifold having a portion thereof disposed through the silencer, wherein the exhaust manifold is configured to receive exhaust gases from the internal combustion engine to heat the exhaust silencer to generate steam;
a steam line secured proximate to an upper end of the silencer;
a secondary steam line configured to bleed off a portion of the steam from the steam line to add downstream to pressurized air to selectively generate a mixture of the steam and pressurized air for use in hydro-excavation; and
a nozzle in fluid communication with the steam line and configured to receive and discharge the steam in order to break up soil.

13. The system of claim 12, further comprising:
a vacuum pump mechanically driven by the internal combustion engine;
a suction hose coupled to the vacuum pump and configured to excavate materials using a vacuum pressure generated by the vacuum pump; and
a debris tank in fluid communication with the suction hose.

14. The system of claim 13, further comprising a valve for controlling an amount of the steam to the nozzle.

15. The system of claim 14, wherein the exhaust silencer is configured to be replenished with additional water to maintain a desired level of the water therein in order to reduce exhaust noise.

16. The system of claim 15, further comprising an auxiliary heater disposed in a lower portion of the exhaust silencer to heat the water.

17. The system of claim 16, wherein the exhaust manifold further comprises a plurality of exhaust pipes.

18. The system of claim 17, wherein the exhaust manifold is orientated for the exhaust gases to enter a lower portion of the exhaust silencer and exit proximate an upper portion of the exhaust silencer.

19. The system of claim 18, wherein the plurality of pipes are arranged along a vertical axis of the exhaust silencer and orientated in a circular pattern.

20. The system of claim 12, further comprising an air compressor configured to generate a mixture of compressed air and steam in fluid communication with the nozzle.

* * * * *